(12) United States Patent
Nagao

(10) Patent No.: US 8,690,112 B2
(45) Date of Patent: Apr. 8, 2014

(54) VIDEO DISPLAY DEVICE WITH SCREEN ANGLE ADJUSTMENT MECHANISM

(75) Inventor: Yoshinari Nagao, Osaka (JP)

(73) Assignee: Panasonic Corporation, Osaka (JP)

( * ) Notice: Subject to any disclaimer, the term of this patent is extended or adjusted under 35 U.S.C. 154(b) by 298 days.

(21) Appl. No.: 13/265,355

(22) PCT Filed: Apr. 22, 2010

(86) PCT No.: PCT/JP2010/002893
§ 371 (c)(1),
(2), (4) Date: Oct. 20, 2011

(87) PCT Pub. No.: WO2010/122792
PCT Pub. Date: Oct. 28, 2010

(65) Prior Publication Data
US 2012/0037777 A1    Feb. 16, 2012

(30) Foreign Application Priority Data

Apr. 23, 2009 (JP) .................................. 2009-104957

(51) Int. Cl.
*A47G 29/00* (2006.01)

(52) U.S. Cl.
USPC ............. 248/371; 248/176.1; 248/372.1; 248/917; 248/923

(58) Field of Classification Search
USPC ........... 248/917–923, 454, 455, 456, 371, 248/372.1, 395, 176.1; 361/679.22, 379.01; 345/204
See application file for complete search history.

(56) References Cited

U.S. PATENT DOCUMENTS 6,130,514 A * 10/2000 Oesterholt et al. ............ 318/438
8,282,062 B2 * 10/2012 Jun et al. ...................... 248/332

FOREIGN PATENT DOCUMENTS

| JP | 02-242287 A | 9/1990 |
| JP | 3-122482 U | 12/1991 |
| JP | 4-12534 Y2 | 3/1992 |
| JP | 11-133872 A | 5/1999 |

OTHER PUBLICATIONS

International Search Report for PCT/JP2010/002893, Jun. 29, 2010.

* cited by examiner

*Primary Examiner* — Amy J Sterling
(74) *Attorney, Agent, or Firm* — RatnerPrestia

(57) ABSTRACT

A video image display apparatus is configured such that a monitor case includes a first gear unit that rotates according to a screen angle of the monitor case, and a clutch mechanism includes: a first torsion coil spring; a second gear unit that is meshed with the first gear unit, wherein a cylindrical portion is fitted to one end of the first torsion coil spring so as to rotate; a cam unit that rotates with a cylindrical portion being fitted to the other end of the first torsion coil spring; and an engagement unit that restricts the rotation of the cam unit, wherein when the screen angle of the monitor case is changed in a near direction, the restriction for the rotation of the cam unit by the engagement unit is removed, and the second gear unit, the first torsion coil spring, and the cam unit are rotated as being interlocked with one another, and when the screen angle of the monitor case is changed in a push-in direction, the restriction for the rotation of the cam unit by the engagement unit is not removed, and only the second gear unit is rotated through the first torsion coil spring.

3 Claims, 4 Drawing Sheets

FIG. 2A   FIG. 2B   FIG. 2C
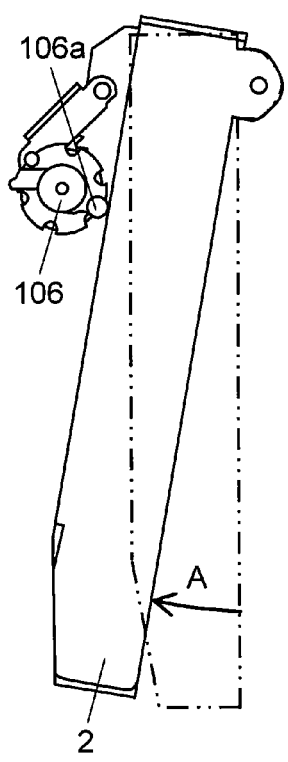
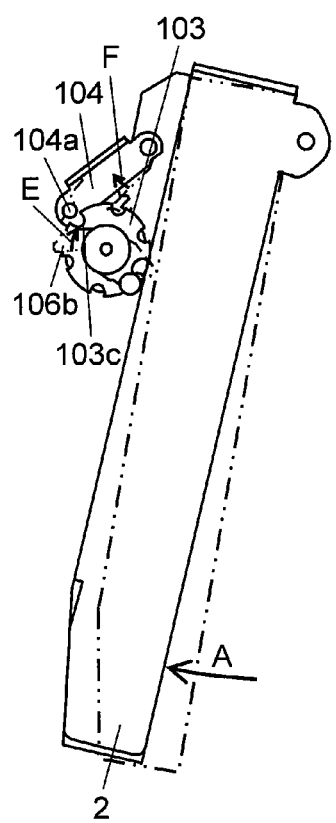
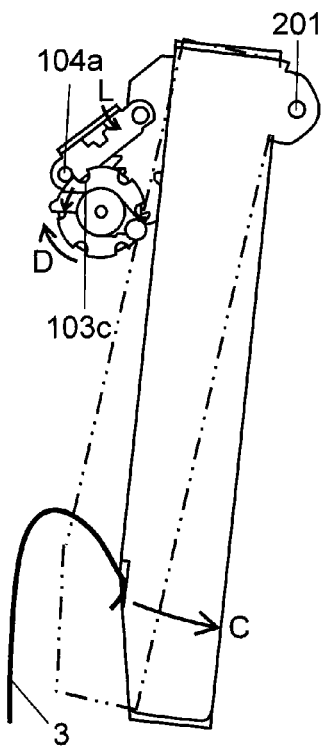
FIG. 2D
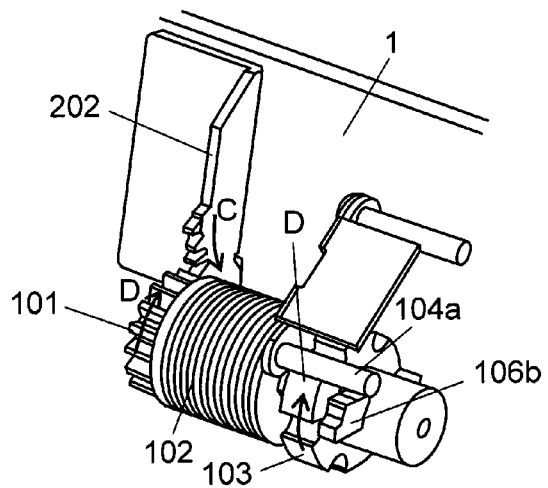

FIG. 4A
FIG. 4B
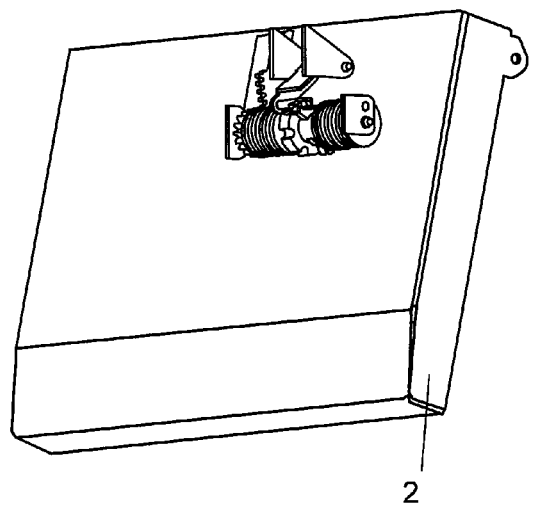
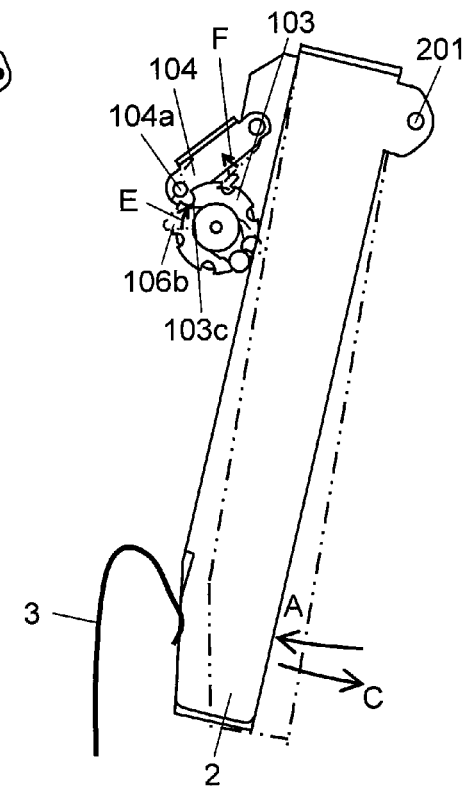
FIG. 4C
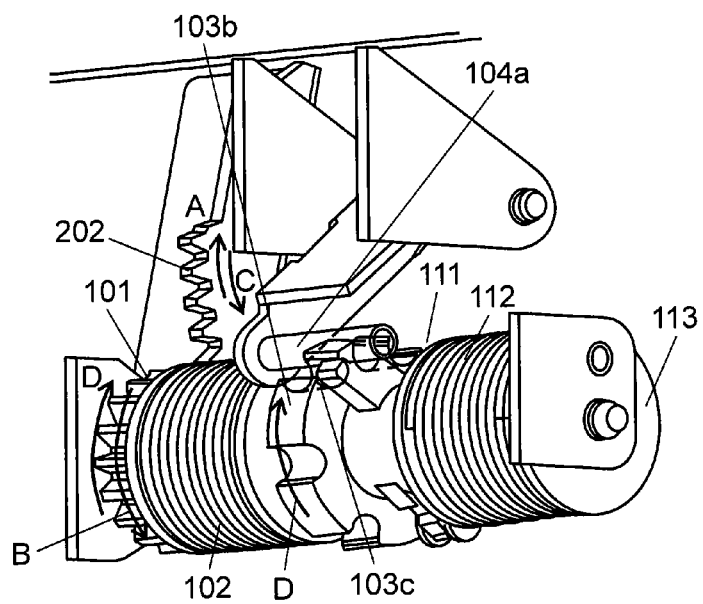

VIDEO DISPLAY DEVICE WITH SCREEN ANGLE ADJUSTMENT MECHANISM

THIS APPLICATION IS A U.S. NATIONAL PHASE APPLICATION OF PCT INTERNATIONAL APPLICATION NO.PCT/JP2010/002893.

TECHNICAL FIELD

The present invention relates to a video image display apparatus with a screen-angle adjusting mechanism.

BACKGROUND ART

It becomes popular that a video image display apparatus such as a television is mounted on a vehicle, such as a car, airplane, train, or ship. In recent years, mounting a display for a person on a backseat has been increased. Such a display includes a display hung down from a ceiling, but this type has a problem of blocking the rearward visibility of a driver. Therefore, a display is sometimes mounted on a head restraint of a front seat.

Patent Literature 1 discloses a configuration in which a video image display apparatus such as a television is mounted on a heat restraint of a front seat. This video image display apparatus is configured to be capable of adjusting an angle of a screen with respect to a vertical direction. The angle of the screen is adjusted by pushing a lower part of the screen, or by inserting a finger below the display and pulling the lower part of the display. When the lower part of the display is pulled to adjust the angle, the upper part of the screen is defined as a supporting point so as to adjust the angle of the screen. However, in order to make the adjustment described above, a user has to insert his/her finger at the lower part of the display to pull the lower part of the display. For this operation, a recessed portion into which a finger is inserted has to be formed at the lower part of the display, which entails a problem of deteriorating a design of the display.

In order to solve this problem, it has been considered that a screen-angle adjusting mechanism disclosed in Patent Literature 2 is employed, for example. In this screen-angle adjusting mechanism, an angle of a screen is adjusted by using a ratchet wheel mounted on a rotation axis and a lock release member of the ratchet wheel. The angle of the screen is adjusted in a stepwise manner by the ratchet wheel in a push-in direction of the screen. When the screen is fully pushed, the lock of the ratchet wheel is released by the lock release member. The screen is returned to the angle of an initial position by elastic force of a spring.

However, in the screen-angle adjusting mechanism disclosed in Patent Literature 2, the angle of the screen can be adjusted only by an amount corresponding to a space between the ratchets of the ratchet wheel, which entails a problem that a delicate angular adjustment cannot be attained.

When the screen with the adjusting mechanism is mounted on a head restraint of a front seat, a head of a person sitting in the front seat and the position of the screen might be close to each other. In the above-mentioned screen-angle adjusting mechanism, the lock member is brought into contact with the ratchet wheel upon adjusting the angle of the screen, whereby a collision sound is produced. Accordingly, every time a person on a backseat adjusts the angle of the screen, an operation sound upon adjusting the angle of the screen is produced, which might give uncomfortable feeling, i.e., give harsh sound, to the person sitting in the front seat.

CITATION LIST

Patent Literature

PTL 1: Unexamined Japanese Utility Model Publication No. H03-122482
PTL 2: Examined Japanese Utility Model Publication No. H04-012534

SUMMARY OF THE INVENTION

The present invention includes a monitor case that holds a monitor; an elastic unit that applies elastic force, which allows a screen angle of the monitor case to be changed in a near direction, to the monitor case; and a clutch mechanism that holds the screen angle of the monitor case. The monitor case includes a first gear unit that rotates according to the screen angle of the monitor case, and the clutch mechanism includes: a first torsion coil spring; a second gear unit that is meshed with the first gear unit, wherein a cylindrical portion is fitted to one end of the first torsion coil spring so as to rotate; a cam unit that rotates with a cylindrical portion being fitted to the other end of the first torsion coil spring; and an engagement unit that restricts the rotation of the cam unit. When the screen angle of the monitor case is changed in the near direction, the restriction for the rotation of the cam unit by the engagement unit is removed, and the second gear unit, the first torsion coil spring, and the cam unit are rotated as being interlocked with one another, and when the screen angle of the monitor case is changed in a push-in direction, the restriction for the rotation of the cam unit by the engagement unit is not removed, and only the second gear unit is rotated through the first torsion coil spring.

According to the present invention, an operation sound is eliminated, and a delicate angular adjustment is possible, when the screen angle of the monitor is adjusted.

BRIEF DESCRIPTION OF DRAWINGS

FIG. 2A is a side view illustrating a state in which the car-mounted monitor is adjusted to be a maximum angle.
FIG. 2B is a side view illustrating a state in which the car-mounted monitor is further pushed in order to release a lock of the car-mounted monitor.
FIG. 2C is a side view illustrating a state in which the lock of the car-mounted monitor is released and the car-mounted monitor is on the way to an initial position.
FIG. 2D is a perspective view illustrating the one-way clutch mechanism in FIG. 2C viewed from the rear.
FIG. 4A is a perspective view illustrating an overall of the car-mounted monitor.
FIG. 4B is a side view illustrating the car-mounted monitor.
FIG. 4C is an enlarged view of a one-way clutch mechanism used for the car-mounted monitor.

DESCRIPTION OF EMBODIMENTS

A screen angle adjusting mechanism according to one embodiment of the present invention will be described below.
First Exemplary Embodiment In the present embodiment, the screen angle adjusting mechanism will be described, wherein a car-mounted monitor is taken as one example of a video image display apparatus.

Figure 1A:
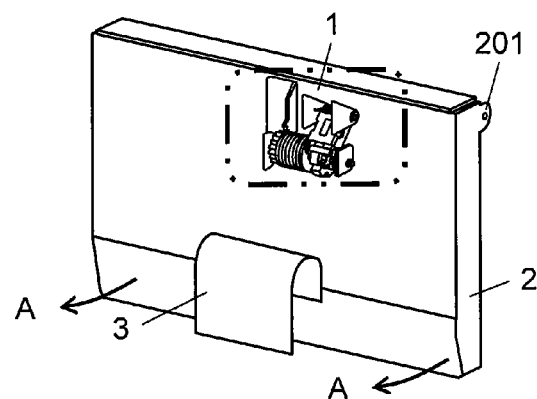
FIG. 1A is an overall view of a car-mounted monitor according to a first exemplary embodiment.

In FIG. 1A, numeral 1 is a one-way clutch mechanism (screen angle adjusting mechanism) serving as a clutch mechanism, and numeral 2 is a monitor case for holding a monitor. Monitor case 2 rotates in a direction of arrow A in the figure with a rotation support 201 being defined as a rotation center. An angle of monitor case 2 can be adjusted with this rotation. One-way clutch mechanism 1 is provided at a rear face of monitor case 2.

Figure 1B:
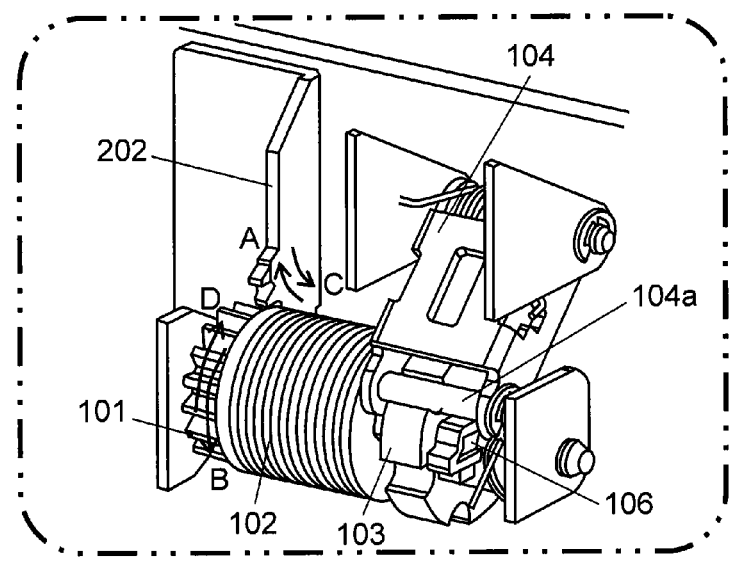
FIG. 1B is an enlarged view of a one-way clutch mechanism used for the car-mounted monitor.
Figure 1C:
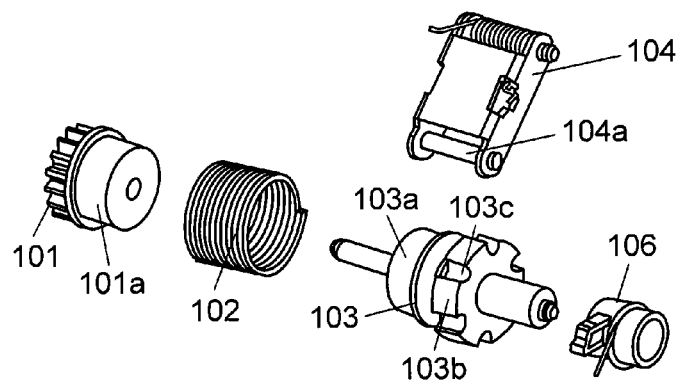
FIG. 1C is an exploded view of the one-way clutch mechanism used for the car-mounted monitor.

In FIG. 1B, numeral 202 is a plate gear fixed to monitor case 2, and it is meshed with clutch gear 101. Plate gear 202 functions as a first gear unit, while clutch gear 101 functions as a second gear unit. Clutch gear 101 has, provided at its one end, cylindrical portion 101a whose surface is smooth as illustrated in FIG. 1C, wherein one end of torsion coil spring 102 is fitted to cylindrical portion 101a. A diameter of cylindrical portion 101a of clutch gear 101 is larger than an inner diameter of torsion coil spring 102, whereby torsion coil spring 102 is always in intimate contact with cylindrical portion 101a.

Cylindrical portion 103a of flower-shaped cam 103 serving as a cam unit is fitted and connected to the other end of torsion coil spring 102. A diameter of cylindrical portion 103a of flower-shaped cam 103 is also larger than the inner diameter of torsion coil spring 102, like cylindrical portion 101a of clutch gear 101. Torsion coil spring 102 is always in intimate contact with cylindrical portion 103a of flower-shaped cam 103.

As illustrated in FIG. 1C, cylindrical portion 103b whose diameter is larger than that of cylindrical portion 103a is mounted to flower-shaped cam 103. Cylindrical portion 103b is formed with plural groove portions 103c. In the first exemplary embodiment, six groove portions are formed. However, the number of the groove portions may be increased or decreased depending upon a range of adjusting an angle or a size of each groove portion.

As illustrated in FIGS. 1B and 1C, stopper pin 104a mounted at one end of link 104 is engaged with groove portion 103c. Link 104 is mounted to a casing so as to be rotatable about one end thereof.

As described above, link 104 restricts the rotation movement of flower-shaped cam 103 in such a manner that link 104 allows stopper pin 104a to be engaged with groove portion 103c of flower-shaped cam 103. Groove portion 103c of flower-shaped cam 103 and stopper pin 104a of link 104 function as an engagement unit.

As illustrated in FIG. 1A, biasing spring 3 is provided in a direction against a direction of arrow A that is a rotating direction of monitor case 2 about rotation support 201. Biasing spring 3 serves as an elastic unit that applies elastic force for changing a screen angle of monitor case 2 in a near direction to monitor case 2.

Next, an operation of one-way clutch mechanism 1 will be described. In FIG. 1A, when monitor case 2 is rotated in the direction of arrow A about rotation support 201, plate gear 202 fixed to monitor case 2 rotates integral with monitor case 2 as illustrated in FIG. 1B, thereby moving in the direction arrow A in FIG. 1B. When plate gear 202 rotates in the direction of arrow A, clutch gear 101 meshed with plate gear 202 rotates in a direction of arrow B in the figure. When clutch gear 101 rotates in the direction of arrow B, clutch gear 101 rotates in the direction of arrow B on the inner surface of torsion coil spring 102 as receiving friction resistance. This is because torsion coil spring 102 fitted to cylindrical portion 101a of clutch gear 101 is wound in the direction in which the diameter increases, as illustrated in FIG. 1C.

In this case, flower-shaped cam 103 fitted to the opposite surface of torsion coil spring 102 does not rotate. This is because stopper pin 104a of link 104 is engaged with groove portion 103c formed on flower-shaped cam 103 as illustrated in FIG. 1B.

When force for rotating monitor case 2 in the direction of arrow A is canceled in FIG. 1A, force that monitor case 2 tries to return in the direction reverse to arrow A is generated on monitor case 2 due to reaction force of biasing spring 3. In this case, as illustrated in FIG. 1B, rotation force in a direction of arrow C is generated on plate gear 202, while rotation force in a direction of arrow D is generated on clutch gear 101 meshed with plate gear 202. The winding direction of torsion coil spring 102 fitted to cylindrical portion 101a of clutch gear 101 is a direction in which the diameter decreases with respect to the direction of arrow D. Therefore, clutch gear 101 cannot rotate in the inner diameter of torsion coil spring 102, so that torsion coil spring 102 is balanced with the reaction force of biasing spring 3 at the rear surface of monitor case 2, and fixed at an optional position.

With the configuration described above, when receiving force in the direction of arrow A, monitor case 2 rotates, and when the force in the direction of arrow A is canceled, the rotation of monitor case 2 stops at this position, so that monitor case 2 is held at this position. Accordingly, the screen angle of monitor case 2, which holds the monitor, can be adjusted and held at an optional angle.

Next, an operation of rotating monitor case 2, which can rotate only in the direction of arrow A in FIG. 1A, in the direction reverse to arrow A so as to return monitor case 2 to an initial position will be described.

As illustrated in FIG. 1B, release lever 106 is provided below stopper pin 104a of link 104. As illustrated in FIG. 1C, release lever 106 is mounted so as to be capable of rotating coaxially with flower-shaped cam 103.

FIG. 2A is a side view illustrating a state in which the car-mounted monitor is adjusted to have the maximum angle, FIG. 2B is a side view illustrating a state in which the car-mounted camera is further pushed in order to release a lock of the car-mounted monitor, FIG. 2C is a side view illustrating a state in which the lock of the car-mounted monitor is released and the car-mounted monitor is on the way to an initial position, and FIG. 2D is a perspective view illustrating the one-way clutch mechanism in FIG. 2C viewed from the rear.

In FIG. 2A, monitor case 2 is pushed in the direction of arrow A from the initial position of monitor case 2 indicated by a two-dot-chain line. With this, as described with reference to FIG. 1A, monitor case 2 can rotate in the direction of arrow A, but cannot rotate in the direction reverse to the direction of arrow A, due to one-way clutch mechanism 1. Therefore, the angle of monitor case 2 can be adjusted at an optional position until monitor case 2 abuts projecting portion 106a of release lever 106 near monitor case 2. The state in which the rear surface of monitor case 2 and projecting portion 106a of release lever 106 are brought into contact with each other becomes an angle adjusting limit (angle adjusting limit position) of monitor case 2.

FIG. 2B illustrates the state in which monitor case 2 is further pushed from the angle adjusting limit position. When monitor case 2 is further pushed, projecting portion 106a of release lever 106 is pushed. Release lever 106 rotates in a direction of arrow E as illustrated in FIG. 2B. In this case, projecting portion 106b, which is formed on the opposite surface of release lever 106 across the rotation center axis with respect to projecting portion 106a, pushes up stopper pin 104a of link 104, which is engaged with groove portion 103c of flower-shaped cam 103, in a direction of arrow F. A distance from the rotation center of release lever 106 to leading ends of projecting portion 106a and projecting portion 106b is set to a length by which stopper pin 104a is pushed up toward the outside of an outermost diameter of flower-shaped cam 103 when monitor case 2 is pushed all the way. With this, stopper pin 104a is separated from groove portion 103c of flower-shaped cam 103, which allows flower-shaped cam 103 to be rotatable.

When stopper pin 104a is disengaged from groove portion 103c of flower-shaped cam 103 due to release lever 106, flower-shaped cam 103 can rotate in any directions. Monitor case 2 rotates about rotation support 201 in the direction of arrow C by the reaction force of biasing spring 3.

In this case, plate gear 202 fixed to monitor case 2 rotates in the direction of arrow C in FIG. 2D. With this, clutch gear 101 meshed with plate gear 202 rotates in the direction of arrow D. When clutch gear 101 rotates in the direction of arrow D, the situation as described with reference to FIG. 1 is attained. Torsion coil spring 102 is wound around clutch gear 101 in a direction in which the inner diameter of the spring decreases, whereby clutch gear 101 integrally rotates on the inner surface of torsion coil spring 102 without being slipped.

Flower-shaped cam 103 is fitted to the other end of torsion coil spring 102. Since torsion coil spring 102 rotates with clutch gear 101 in the direction of reducing the inner diameter, flower-shaped cam 103 also rotates in the direction of arrow D, which is the same direction, in FIG. 2D.

A load is applied to link 104 in a direction of arrow L due to the force of a spring (not illustrated) as illustrated in FIG. 2C. When monitor case 2 rotates about rotation support 201 in the direction of arrow C by the reaction force of biasing spring 3, release lever 106 is returned to an original position, resulting in that stopper pin 104a tries to return to the original position of groove portion 103c of flower-shaped cam 103.

However, since flower-shaped cam 103 starts to rotate in the direction of arrow D, stopper pin 104a runs upon the outer periphery of flower-shaped cam 103. Then, flower-shaped cam 103 keeps on rotating in the direction of arrow D. As illustrated in FIG. 2C, groove portion 103c, which is adjacent to groove portion 103c from which stopper pin 104a is disengaged, comes to a position of stopper pin 104a. In this case, stopper pin 104a drops into adjacent groove portion 103c, whereby the rotation of flower-shaped cam 103 stops. Since the rotation of flower-shaped cam 103 stops, the rotations of torsion coil spring 102 and clutch gear 101 connected to flower-shaped cam 103 also stop. Since plate gear 202 meshed with clutch gear 101 also stops, the movement of monitor case 2 stops.

In the first exemplary embodiment, six groove portions 103c are formed on flower-shaped cam 103, wherein an angle between adjacent groove portions 103c and the rotation center of flower-shaped cam 103 is set to be 60 degrees. Specifically, it is set such that, when flower-shaped cam 103 rotates in the direction of arrow D at an angle of 60 degrees, monitor case 2 is returned to the initial position from the maximum adjusting angle position.

Specifically, numbers of teeth of clutch gear 101 and plate gear 202 are set such that, when clutch gear 101, which makes the rotation same as that of flower-shaped cam 103, rotates in the direction of arrow D by 60 degrees, monitor case 2 is returned to the initial position.

It is set such that, when flower-shaped cam 103 rotates in the direction of arrow D by 60 degrees, monitor case 2 is returned by 10 degrees.

According to the configuration described above, the monitor angle can be adjusted to an optional angle by pushing monitor case 2 in the push-in direction from the initial position. When monitor case 2 is further pushed in from the maximum angle position, the restriction in one way by one-way clutch mechanism 1 is removed, so that the monitor case can be returned to the initial position.

When clutch gear 101 moves as slipping on the inner surface of torsion coil spring 102 in the direction of arrow D in the case where one-way clutch mechanism 1 is operated, an operating noise is not produced.

As described above, when the screen angle of monitor case 2 is changed in the near direction, the restriction of the rotation of flower-shaped cam 103 by link 104 is removed, and clutch gear 101, torsion coil spring 102, and flower-shaped cam 103 can be rotated as being interlocked with one another. When the screen angle of monitor case 2 is changed in the push-in direction, only clutch gear 101 can be rotated through torsion coil spring 102 without removing the restriction of the rotation of flower-shaped cam 102 by link 104.

As a result, when the screen angle of monitor case 2 that holds the monitor is adjusted, the operation sound is eliminated, and a delicate angular adjustment is possible. The present embodiment can be utilized for a device that needs an adjustment of a screen angle at an optional position in an environment that should be silent.

Second Exemplary Embodiment

In the first exemplary embodiment, when release lever 106 pushes up stopper pin 104a in the direction of arrow F as illustrated in FIG. 2B, stopper pin 104a is disengaged from groove portion 103c of flower-shaped cam 103, so that monitor case 2 starts to move in the direction of arrow C as illustrated in FIG. 2C. In this case, it is necessary that flower-shaped cam 103 is rotated in the direction of arrow D before stopper pin 104a returns to groove portion 103c of flower-shaped cam 103.

For example, in the state in FIG. 2B, monitor case 2 is moved in the direction of arrow A, whereby stopper pin 104a of release lever 106 is disengaged from groove portion 103c of flower-shaped cam 103. When monitor case 2 is further pushed in the direction of arrow A, flower-shaped cam 103 undesirably moves in the direction reverse to the direction of arrow D. Then, monitor case 2 starts to move in the direction of arrow C with the reaction force of biasing spring 3, whereby flower-shaped cam 103 starts to move in the direction of arrow D. With this movement, stopper pin 104a makes a reverse rotation to again return to groove portion 103c, which causes a situation that the releasing operation cannot be executed.

In view of this, it is necessary in the first exemplary embodiment that, at the moment stopper pin 104a is disengaged from groove portion 103c, monitor case 2 cannot be pushed in any more. Therefore, a management in the variation of size becomes significant.

The second exemplary embodiment is accomplished for improving the releasing operation in the first exemplary embodiment. An outline and operation of a one-way clutch mechanism in the second exemplary embodiment will be described.

Figure 3A:
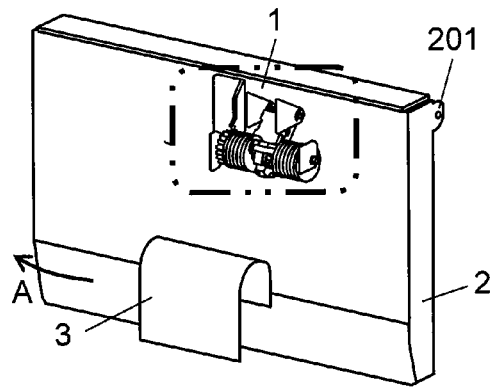
FIG. 3A is an overall view of a car-mounted monitor according to a second exemplary embodiment.
Figure 3B:
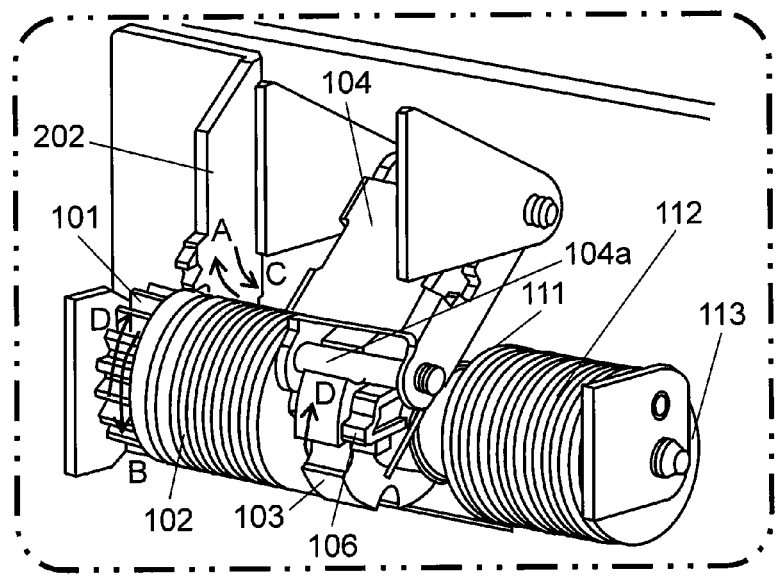
FIG. 3B is an enlarged view of a one-way clutch mechanism used for the car-mounted monitor.
Figure 3C:
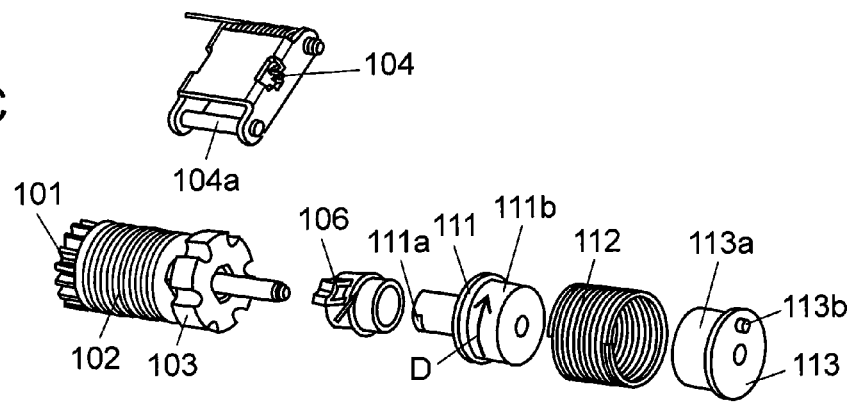
FIG. 3C is an exploded view of the one-way clutch mechanism used for the car-mounted monitor.

FIG. 3A is an overall view of a car-mounted monitor according to the second exemplary embodiment, FIG. 3B is an enlarged view of a one-way clutch mechanism used for the car-mounted monitor, and FIG. 3C is an exploded view of the one-way clutch mechanism used for the car-mounted monitor.

In FIGS. 3A to 3C, the car-mounted monitor according to the second exemplary embodiment is different from that in the first exemplary embodiment in that components indicated by numerals 111 to 113 are added. The components same as those in the first exemplary embodiment are identified by the same numerals, and the description will not be repeated.

In FIGS. 3B and 3C, numeral 111 is clutch axis A serving as a first clutch axis, 112 is a torsion coil spring, and 113 is clutch axis B serving as a second clutch axis. Clutch axis A 111 and clutch axis B 113 are arranged to have rotation centers same as those of clutch gear 101 and flower-shaped cam 103.

One end of clutch axis A 111 close to flower-shaped cam 103 has an oval convex portion 111a. The clutch axis A 111 is fitted to flower-shaped cam 103 having formed thereon oval recessed portion having the same shape, whereby clutch axis A 111 makes the rotation same as the rotation of flower-shaped cam 103, when flower-shaped cam 103 rotates. It is to rotate flower-shaped cam 103 and clutch axis A 111 integrally that one end of clutch axis A 111 close to flower-shaped cam 103 is formed to have the oval convex portion 111a. If a configuration in which they rotate in the same direction with the same angle is established, the convex portion and the recessed portion do not have to have the oval shape. They may have a rectangular shape, for example. Further, they may not be fitted to each other, but they may be fixed with a screw. Flower-shaped cam 103 and clutch axis A 111 may be integrally formed, supposing that release lever 106 is attached afterward.

Clutch axis A 111 is formed with a cylindrical portion 111b at its other end that is opposite to the end on which the oval convex portion 111a is formed. Cylindrical portion 111b is fitted to torsion coil spring 112. This is the same structure as cylindrical portion 101a of clutch gear 101 and torsion coil spring 102 in the first exemplary embodiment. The diameter of cylindrical portion 111b is larger than the inner diameter of torsion coil spring 112, whereby torsion coil spring 112 is always in intimate contact with cylindrical portion 111b. Torsion coil spring 102 serves as a first torsion coil spring, while torsion coil spring 112 serves as a second torsion coil spring.

It is configured such that clutch axis B 113 is fitted to torsion coil spring 112 at the side opposite to clutch axis A 111. This is the same structure as torsion coil spring 102 and cylindrical portion 103a of flower-shaped cam 103 in the first exemplary embodiment. The diameter of cylindrical portion 113a of clutch axis B 113 is larger than the inner diameter of torsion coil spring 112. Torsion coil spring 112 is always in intimate contact with cylindrical portion 113a.

Clutch axis B 113 cannot rotate due to the structure in which an anti-rotation projecting portion 113b is fitted to the casing. The inhibition of rotation is achieved by projecting portion 113b in the second exemplary embodiment, but it may be attained by a unit such as a screwing.

The winding direction of torsion coil spring 112 is in the direction of arrow D as illustrated in FIG. 2C. Due to the winding direction described above, the inner diameter of torsion coil spring 112 increases when clutch axis A 111 rotates in the direction of arrow D, whereby cylindrical portion 111b of clutch axis A 111 can slide on the inner surface of torsion coil spring 112.

On the contrary, when clutch axis A 111 tries to rotate in the direction reverse to the direction of arrow D, the inner diameter of torsion coil spring 112 decreases. Cylindrical portion 111b of clutch A 111 and cylindrical portion 113a of clutch axis B 113 are tightened on the inner surface of torsion coil spring 112, whereby clutch axis A 111 cannot rotate.

Clutch axis A 111 can rotate only in one direction that is the direction of arrow D. Flower-shaped cam 103 fitted to the oval convex portion 111a of clutch axis A 111 can also rotate in one direction that is the direction of arrow D.

FIG. 4A is a perspective view illustrating an overall of the car-mounted monitor, FIG. 4B is a side view of the car-mounted monitor, and FIG. 4C is an enlarged view of the one-way clutch mechanism used for the car-mounted monitor.

The operation of disengaging stopper pin 104a from groove portion 103c of flower-shaped cam 103 by release lever 106 after monitor case 2 is pushed in is the same as that in the first exemplary embodiment.

The difference from the first exemplary embodiment will be described with reference to FIG. 4C. When monitor case 2 is further pushed in with the state in which stopper pin 104a is disengaged from groove portion 103c of flower-shaped cam 103, plate gear 202 fixed to monitor case 2 rotates in the direction of arrow A about rotation support 201.

With this, clutch gear 101 meshed with plate gear 202 rotates in the direction of arrow B. Due to the rotation of clutch gear 101, friction resistance is exerted on the inner surface of fitted torsion coil spring 102, whereby force for rotating torsion coil spring 102 in the direction of arrow D is similarly exerted on torsion coil spring 102. When torsion coil spring 102 rotates in the direction of arrow B, friction resistance with the inner surface of torsion coil spring 102 is produced on flower-shaped cam 103 fitted thereto, so that force for rotating flower-shaped cam 103 in the direction of arrow B is exerted.

However, as illustrated in FIG. 3, flower-shaped cam 103 can rotate only in the direction of arrow D by clutch axis A 111, torsion coil spring 112, and clutch axis B 113. Therefore, torsion coil spring 102 and flower-shaped cam 103 slip with each other by the friction resistance, resulting in that flower-shaped cam 103 does not rotate, but only monitor case 2 rotates in the direction of arrow A. Therefore, stopper pin 104a can be separated from groove portion 103c of flower-shaped cam 103 by a sufficient distance with release lever 106.

When force for pushing monitor case 2 in the direction of arrow A is canceled from this state, monitor case 2 is returned in the direction of arrow C with the reaction force of biasing spring 3. When monitor case 2 rotates in the direction of arrow C, plate gear 202 fixed to monitor case 2 also rotates in the direction of arrow C. Clutch gear 101 meshed with plate gear 202 rotates in the direction of arrow D, so that flower-shaped cam 103 also rotates in the direction of arrow D.

When monitor case 2 rotates in the direction of arrow C, release lever 106 is also returned to the original position. With this, stopper pin 104a of link 104 tries to return to the original position. However, since flower-shaped cam 103 rotates in the direction of arrow D, groove portion 103c of flower-shaped cam 103 has already rotated in the direction of arrow D when stopper pin 104a is returned to the position of the outer diameter of flower-shaped cam 103. Accordingly, stopper pin 104a runs upon the outer diameter of cylindrical portion 103b of flower-shaped cam 103, so that flower-shaped cam 103 rotates in the direction of D. The operation afterward is the same as that in the first exemplary embodiment, wherein groove portion 103c of flower-shaped cam 103 rotates by 60 degrees after monitor case 2 is returned to the initial position. Then, stopper pin 104a is dropped in adjacent groove portion 103c, so that the rotation of flower-shaped cam 103 stops. Accordingly, monitor case 2 is returned to the initial position.

As described above, when the screen angle of monitor case 2 is changed in the near direction, the restriction of the rotation of flower-shaped cam 103 by link 104 is removed, and clutch gear 101, torsion coil spring 102, flower-shaped cam 103, and first clutch axis 111 can be rotated as being interlocked with one another through torsion coil spring 112.

When the screen angle of monitor case 2 is changed in the push-in direction, the restriction of the rotation of flower-shaped cam 103 by link 104 is removed, flower-shaped cam 103 and first clutch axis 111 are fixed as interlocking with each other through torsion coil spring 112, and only clutch gear 101 can be rotated through torsion coil spring 102.

When stopper pin 104a is disengaged from groove portion 103c of flower-shaped cam 103, whereby monitor case 2 moves in the direction of arrow C, clutch gear 101, torsion coil spring 102, flower-shaped cam 103, and clutch axis A 111 integrally rotate. In this case, they rotate with the friction resistance caused between clutch axis A 111 and torsion coil spring 112, whereby a damper effect with respect to biasing spring 3, which presses monitor case 2 in the direction of arrow C, is generated, and due to this damper effect, a high-class operation can be attained.

Industrial Applicability

The present invention is applicable to a video image display apparatus that adjusts an angle of a screen mounted to a head restraint or the like.

Reference Marks In The Drawings

| | |
|---|---|
| 1 | One-way clutch mechanism |
| 2 | Monitor case |
| 3 | Biasing spring |
| 101 | Clutch gear |
| 101a | Cylindrical portion |
| 102 | Torsion coil spring |
| 103 | Flower-shaped cam |
| 103a | Cylindrical portion |
| 103b | Cylindrical portion |
| 103c | Groove portion |
| 104 | Link |
| 104a | Stopper pin |
| 106 | Release lever |
| 106a | Projecting portion |
| 106b | Projecting portion |
| 111 | Clutch axis A |
| 111a | Convex portion |
| 111b | Cylindrical portion |
| 112 | Torsion coil spring |
| 113 | Clutch axis B |
| 113a | Cylindrical portion |
| 113b | Projecting portion |
| 201 | Rotation support |
| 202 | Plate gear |

The invention claimed is:

1. A video image display apparatus with screen-angle adjusting mechanism comprising:
    a monitor case that holds a monitor;
    an elastic unit that applies elastic force, which allows a screen angle of the monitor case to be changed in a near direction, to the monitor case; and
    a clutch mechanism that holds the screen angle of the monitor case, wherein
    the monitor case includes a first gear unit that rotates according to the screen angle of the monitor case, and
    the clutch mechanism includes:
    a first torsion coil spring;
    a second gear unit that is meshed with the first gear unit, wherein a cylindrical portion is fitted to one end of the first torsion coil spring so as to rotate;
    a cam unit that rotates with a cylindrical portion being fitted to the other end of the first torsion coil spring; and
    an engagement unit that restricts the rotation of the cam unit, wherein
    when the screen angle of the monitor case is changed in the near direction,
    the restriction for the rotation of the cam unit by the engagement unit is removed, and the second gear unit, the first torsion coil spring, and the cam unit are rotated as being interlocked with one another, and
    when the screen angle of the monitor case is changed in a push-in direction,
    the restriction for the rotation of the cam unit by the engagement unit is not removed, and only the second gear unit is rotated through the first torsion coil spring.

2. The video image display apparatus with screen-angle adjusting mechanism according to claim 1, wherein
    the clutch mechanism includes:
    a second torsion coil spring;
    a first clutch axis that is fixed to the cam unit, wherein a cylindrical portion is fitted to one end of the second torsion coil spring; and
    a second clutch axis that is fixed to a casing, wherein a cylindrical portion is fitted to the other end of the second torsion coil spring, wherein
    when the screen angle of the monitor case is changed in the near direction,
    the restriction for the rotation of the cam unit by the engagement unit is removed, and the second gear unit, the first torsion coil spring, the cam unit, and the first clutch axis are rotated as being interlocked with one another through the second torsion coil spring, and
    when the screen angle of the monitor case is changed in the push-in direction,
    the restriction for the rotation of the cam unit by the engagement unit is removed, the cam unit and the first clutch axis are fixed as being interlocked with each other through the second torsion coil spring, and only the second gear unit is rotated through the first torsion coil spring.

3. The video image display apparatus with screen-angle adjusting mechanism according to claim 1, wherein
    the clutch mechanism includes:
    the engagement unit having a stopper pin arranged thereon;
    the cam unit having a groove portion that is engaged with the stopper pin; and
    a release lever having a projecting portion, wherein
    the release lever rotates according to the screen angle of the monitor case, and
    when the screen angle is changed in the push-in direction, the projecting portion of the release lever pushes up the stopper pin from the groove portion in order to remove the restriction for the cam unit by the engagement unit.

* * * * *